No. 704,492. Patented July 15, 1902.
J. H. ABLETT.
DINNER PAIL AND HEATER.
(Application filed Sept. 28, 1901.)
(No Model.)
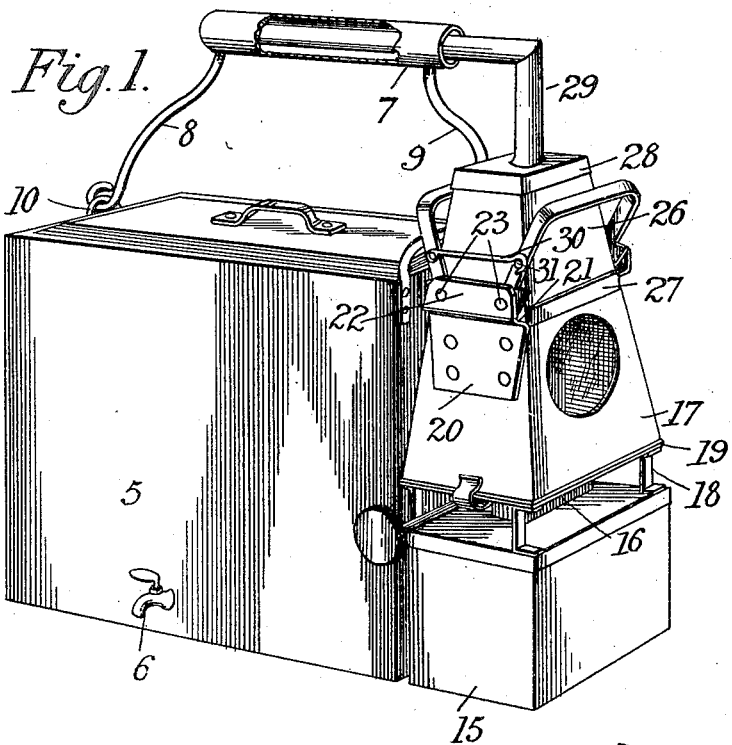
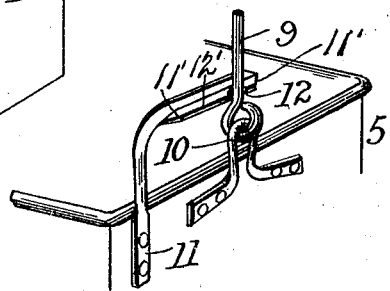
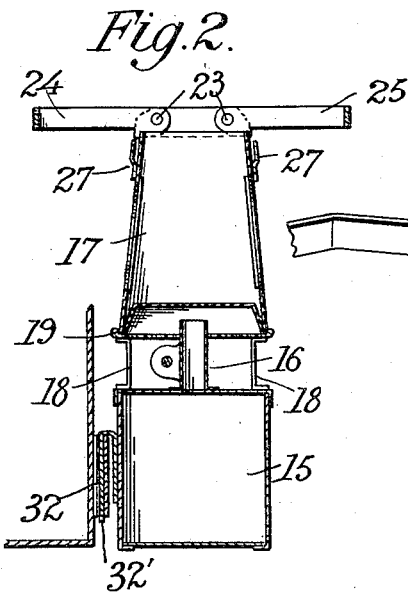
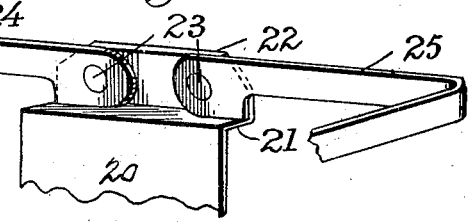
Witnesses
J. H. Ablett Inventor
by C. A. Snow & Co.
Attorneys

UNITED STATES PATENT OFFICE.

JOSEPH HENRY ABLETT, OF GLENNIE, MICHIGAN.

DINNER PAIL AND HEATER.

SPECIFICATION forming part of Letters Patent No. 704,492, dated July 15, 1902.

Application filed September 28, 1901. Serial No. 76,905. (No model.)

*To all whom it may concern:*

Be it known that I, JOSEPH HENRY ABLETT, a citizen of the United States, residing at Glennie, in the county of Alcona and State of Michigan, have invented a new and useful Dinner Pail and Heater, of which the following is a specification.

This invention relates to dinner-pails; and it has for its object to provide a construction of pail adapted for attachment of a heater thereto in such manner as to heat the handle of the pail when the latter is being carried and which heater may be detached and adjusted to permit the pail to be placed thereon to heat it when desired.

Further objects and advantages of the invention will be apparent from the following description.

In the drawings forming a portion of this specification, and in which like numerals of reference indicate similar parts in the several views, Figure 1 is a perspective view showing the pail with the heater attached and in position for transportation. Fig. 2 is a transverse vertical section through the heater adjusted to receive and support the pail. Fig. 3 is a detail perspective view showing the position of the sections of the supporting-frame for the pail. Fig. 4 is a perspective view showing the end of the bucket and the latch for holding the bail in vertical position.

Referring now to the drawings, there is shown a pail 5, which may be provided with any suitable arrangement and number of compartments, and connected with which pail is a spigot 6, through which coffee or other liquid may be drawn that has been warmed in the pail in the manner hereinafter described.

The pail 5 has a tubular handle 7, from the ends of which depend the arms 8 and 9 in the form of wires, that are engaged with ears 10 at the ends of the pail, these arms and handle forming the bail for the pail. When the pail is used for heating any commodity placed therein, it is desirable that the bail be supported in an upright or vertical position in order that it may not fall down against the side of the pail and become so hot as not to be touched. For this purpose a spring-latch is provided and consists of a plate 11, which is riveted or otherwise secured to the end of the pail and the upper end of which is bent laterally beyond the adjacent ear to which the bail is attached, and this laterally-bent portion has a notch 12 therein. The notched portion of the plate is flattened at 12, and the ends 11' of the flattened portion are beveled, so that when the bail is raised into vertical position it strikes against the bevel at one end of the plate and pressing the plate rearwardly passes onto the notch, when the plate springs forwardly to receive the bail in the notch and hold the latter against pivotal movement. By grasping the bail and moving it forcibly it may be moved from the notch and into inclined position.

The heater employed in connection with this pail consists of a base or font 15, adapted to receive oil and from which extends a wick-tube 16, over which is disposed a metal chimney 17, supported from the font by the feet 18, the chimney being hinged at a point (not shown) directly to a frame 19, attached to the feet, and from which frame it is adapted to be swung when the wick is to be lighted. When in lowered position, the chimney is held by a spring-snap 19' upon the frame. At the sides of the chimney are attached the plates 20, the upper portions of which are bent outwardly at 21 to form shoulders and then upwardly at 22 to form ears which are perforated to receive pivots 23, on which are mounted the ends of two U-shaped frames 24 and 25, which are adapted to lie in a common horizontal plane upon the shoulders 21 and projecting therebeyond to form a supporting-frame to receive the pail 5 when the latter is to be heated.

In order that the heat of the heater may be conducted to the handle of the pail to heat it and warm the hand of the person carrying the pail, the chimney 17 is provided with an upwardly-tapered extension 26, the lower edge of which is disposed between the chimney and the bead or flange 27, secured thereto and spaced from the upper edge thereof. Over the upper end of the extension is disposed a tapered cap 28, and from this cap leads a pipe or chimney 29, which is turned laterally and taken through the hollow handle of the pail, said pipe being spaced from the handle, so as to form an air-space, which will permit of warming the handle without overheating it.

To hold the pail-supporting frame up when the heater is in the position to warm the handle, one member of the frame is provided with a hook 30, which is adapted to engage over a pin 31 on the other member, as shown in Fig. 1. On the end of the pail is a loop 32, and on the base or font of the heater is a hook 32', adapted for engagement with the loop to hold the heater against the end of the pail when in position to warm the handle. When the heater is to be used to warm materials in the pail, the supporting-frame is of course opened up, and the chimney extension and cap, with its pipe, are removed.

In practice modifications of the specific construction shown may be made, and any suitable materials and proportions may be used for the various parts without departing from the spirit of the invention.

What is claimed is—

1. The combination with a pail having a hollow handle, of an exteriorly-connected heater provided with a heat-pipe extending into said pail-handle and constructed and arranged to conduct heat from the heater thereto.

2. The combination with a pail having a hollow handle, of a heater removably connected to the pail and having a chimney and a removably-attached pipe leading through the handle to conduct heat thereto, said heater having a supporting-frame to support the pail when the heater is detached from the pail.

3. The combination with a pail having a pivoted bail including a hollow handle, of a heater removably connected to the exterior of the pail and including a chimney having a removable pipe extension leading to the handle to conduct heat thereto, and means connected with the pail for holding the bail against movement when the pipe is engaged with the handle.

4. The combination with a pail of a heater having a chimney provided with angular supporting-plates, a frame mounted in said plates and adapted to swing into open horizontal supporting position for receiving said pail, and means for detachably connecting said pail and heater.

In testimony that I claim the foregoing as my own I have hereto affixed my signature in the presence of two witnesses.

JOSEPH HENRY ABLETT.

Witnesses:
DANIEL HOYER,
GEORGE MCNICHOL.